March 5, 1935.                L. M. LITTLEFIELD                1,993,067
                                  SPLASH GUARD
                                Filed June 11, 1932
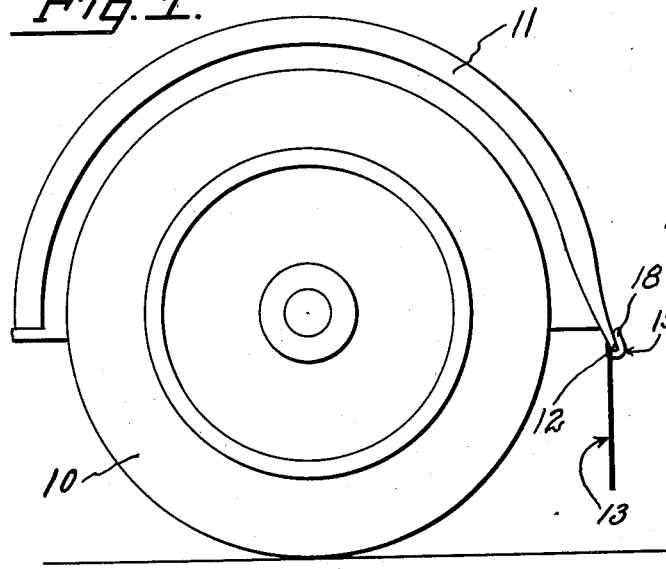
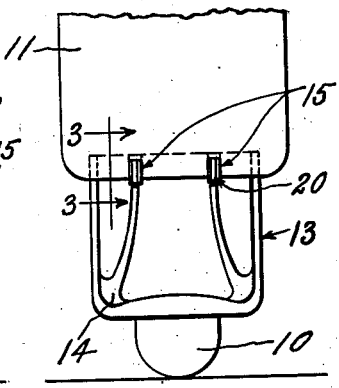
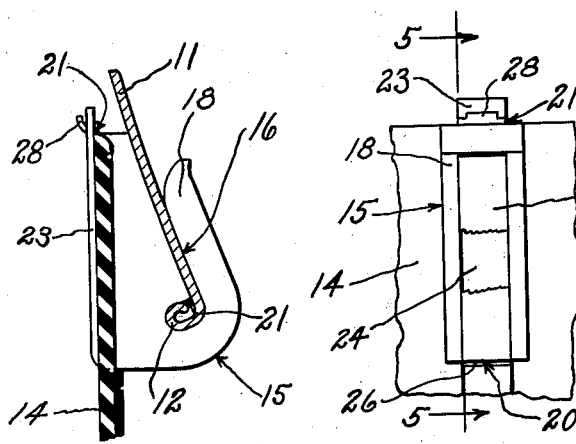
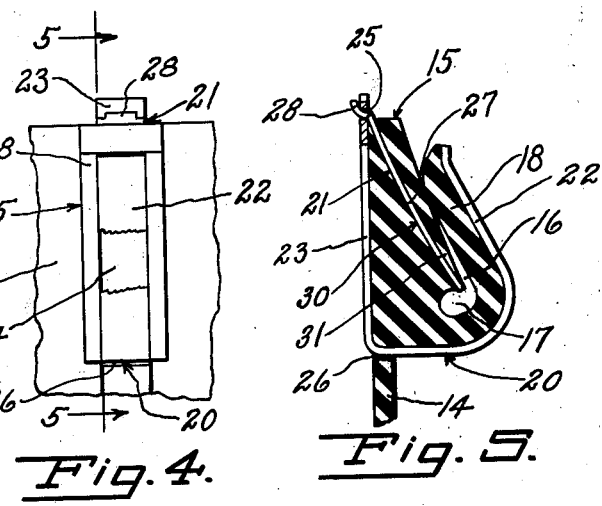
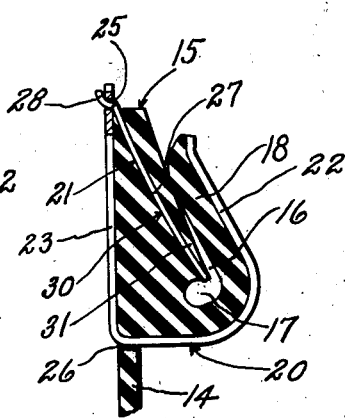
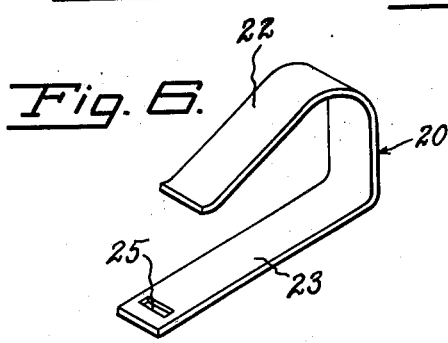
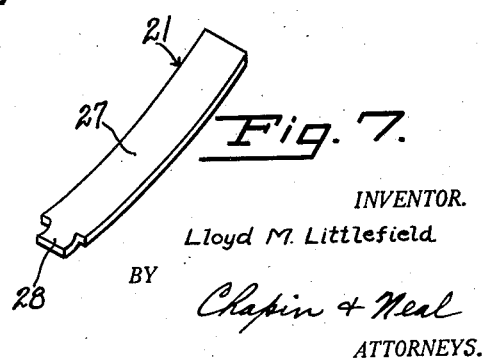
INVENTOR.
Lloyd M. Littlefield
BY
Chapin & Neal
ATTORNEYS.

Patented Mar. 5, 1935

1,993,067

UNITED STATES PATENT OFFICE 1,993,067

SPLASH GUARD

Lloyd M. Littlefield, Chicopee Falls, Mass., assignor, by mesne assignments, to The Fisk Rubber Corporation, a corporation of Delaware Application June 11, 1932, Serial No. 616,647

4 Claims. (Cl. 280—152)

This invention relates to detachable splash guards for the rear fenders of automobiles.

One object of the invention is to provide an improved attaching means which will more securely hold the guard in position on the fender and at the same time permit the guard to be molded from a suitable rubber compound with increased facility. A further object is to provide a splash guard in which the attaching means may be readily replaced in case of breakage. Other and further objects will be apparent from the following specification and claims.

In the accompanying drawing which illustrates one embodiment of the invention,

Fig. 1 is a side elevation of an automobile wheel having a fender equipped with a splash guard embodying the invention;

Fig. 2 is a rear view of the combination shown in Fig. 1;

Fig. 3 is a sectional detail view, on a larger scale, substantially on line 3—3 of Fig. 2;

Fig. 4 is a detail plan view of the attaching means;

Fig. 5 is a sectional view substantially on line 5—5 of Fig. 4;

Fig. 6 is an isometric view of the outer compression member of the attaching means; and Fig. 7 is a similar view of the inner compression member of the attaching means.

In the drawing, 10 indicates the wheel of an automobile provided with a conventional fender 11 having the usual depending beaded portion 12 to which the splash guard 13 is attached. The guard comprises a generally rectangular sheet 14 of flexible rubber or other similar moldable material. The upper edge portion of sheet 14 is provided with two, or more, attaching members or lugs 15, which members are preferably molded integrally with sheet 14, the construction of members 15, as will later more fully appear, being particularly adapted to such unitary molding. Each of members 15 is provided with upwardly opening, inclined slot 16, the lower end of which terminates in an enlarged transverse opening 17 in which the beaded portion 12 of the fender 11 seats when the fender is forced into slot 16 to attach the guard to the fender as best shown in Fig. 3.

As shown in Figs. 1, 2 and 3, when the guard is in operative position on the fender the upper portion of the guard and the portion of members 15 to the rear of slot 16 are concealed behind the fender, only the lip portions 18 of the members 15 engaging the outer face of the fender.

The members 15 are held in firm engagment with the fender by means of a two-part, spring compression device, separable from the members 15. Each compression device comprises an outer member 20 and an inner member 21 preferably formed of flat spring steel. As best shown in Figs. 4, 5 and 6, outer member 20 has a generally hooked form, and includes a portion 22 conforming to the shape of the outer face of member 15, and a straight portion 23 adapted to engage the rear face of sheet 14 opposite the member 15. The member 20 is preferably made narrower than member 15 and the latter provided with a groove 24 in which portion 22 seats to prevent unintentional sidewise displacement of member 20. A slot 25 is provided in the free end of portion 23 for a purpose later described. The sheet 14 is provided at the base of member 15 with an opening 26 through which member 20 passes.

The inner member 21 of the compression devices is slightly curved as indicated at 27 and is provided at its upper end with a hooked tongue 28, engageable in the slot 25 of member 20. Member 15 is provided in the molding operation with a channel 30, extending in an inclined curve from the rear top edge of member 15 to the juncture of slot 16 with the opening 17, in which channel the member 21 is adapted to be positioned. Channel 30 is preferably tapered in cross-section, the upper end being substantially the same as the cross-section of member 21 but decreases in cross-section toward its lower end. This arrangement facilitates insertion of member 21 into the channel while assuring that member 21 which is of uniform cross-section will be held tightly in the channel. The curvature of the channel 30 and member 21 assists in preventing unintentional withdrawal of member 17 and also provides an increased thickness or cushion of rubber between the member 21 and the fender as indicated at 31. Member 21 is made of a length such that the upper end extends slightly beyond the upper face of member 15 with the hooked tongue 28 extending to the rear of sheet 14 sufficiently to be engaged in slot 25 when the parts are assembled, as shown in Figs. 3, 4 and 5, while the lower end of member 21 extends slightly beyond the lower opening of channel 30 to engage behind the bead 12 of the fender 11 as shown in Fig. 3.

It will be seen that the guard proper is molded without the need of any metal parts being encased in the rubber during the molding and curing operation, and that after the molding and curing is completed the compression device is easily assembled in operative position by inserting member 21 in channel 30, inserting portion 23 of member 20 through opening 26, forcing portion 22 into groove 24 and snapping tongue 28 into slot 25.

The spring action of member 20 tends to close the slot 16 as shown in Fig. 5 and to attach the guard to the fender it is only necessary to force the fender 11 into slot 16 until the bead 12 seats in opening 17 with the lower end of member 21 engaged behind it, the rubber of member 15 and the spring action of member 20 yielding to permit the bead to be forced past the lower end of 21 into the opening 17. The guard is thus held tightly to the fender, without danger of rattling or marring the fender since the only metal in contact with the latter is the end of member 21 which engages the inside crevice of bead 12.

It will also be evident that if any part of the compression device 20—21 becomes broken or damaged it may be easily replaced.

While two connecting members are shown in the drawing it will be understood that any desired number may be employed and that while the members 15 have been described as molded integrally with the rubber sheet 14, the latter sheet may be formed of fabric or other suitable flexible material to which members 15 are cemented or otherwise secured.

Where the weight and size of the guard permits member 21 may be omitted.

Having described an embodiment of the invention, I claim:

1. A splash guard, for attachment to the fender of an automobile, which comprises a sheet of flexible material, a plurality of attaching devices secured to the upper edge portion of said sheet, each of said attaching devices including a rubber lug provided with an upwardly opening slot in which the edge of the fender is adapted to be engaged and a spring member removably engaged about the outside of said lug and extending from the forward edge of said slot downwardly and rearwardly through said sheet and upwardly to the rear edge of said slot, said spring tending to cause the walls of the slot to grip the fender.

2. A splash guard, for attachment to the fender of an automobile, which comprises a sheet of flexible material, a plurality of attaching devices secured to the upper edge portion of said sheet, each of said attaching devices including a rubber lug provided with an upwardly opening slot in which the edge of the fender is adapted to be engaged, an inclined channel formed in the lug, the upper end of the channel opening at the top of the lug to the rear of the open upper end of the slot, the lower end of the channel opening to the lower end of the slot, a spring member removably positioned in the channel with its lower end extending into the slot, a second removable spring member engaging about the outside of said lug and tending to cause the walls of the slot to grip the fender and means to connect the upper end of the first mentioned spring member to said second spring member.

3. A splash guard, for attachment to the beaded flange of the fender of an automobile, which comprises a sheet of flexible material, a plurality of attaching devices secured to the upper edge portion of said sheet, each of said attaching devices including a rubber lug provided with an upwardly opening slot in which the flange of the fender is adapted to be engaged, the lower end of said slot terminating in an enlarged transverse opening in which the beaded edge of the flange seats, and a removable spring member engaging about the outside of said lug and tending to cause the walls of the slot and said transverse opening to grip the fender flange.

4. A splash guard, for attachment to the beaded flange of the fender of an automobile, which comprises a sheet of flexible material, a plurality of attaching devices secured to the upper edge portion of said sheet, each of said attaching devices including a rubber lug provided with an upwardly opening slot in which the flange of the fender is adapted to be engaged, said slot terminating at its lower end in a rearwardly offset transverse opening in which the beaded edge of the flange seats, an inclined channel formed in the lug, the upper end of said channel opening at the top of the lug to the rear of the open upper end of the slot, the lower end of the channel opening substantially at the line of juncture of the slot and transverse opening, an inner spring member separably positioned in the channel with its lower end extending into the slot and provided at its upper end with a rearwardly extending tongue, an opening formed in the sheet at the base of the lug, and an outer, separable spring member engaging about said lug and extending through said opening in the sheet and upwardly, rearwardly of the lug, to a point above the edge of the sheet, the end of said upwardly extended portion being provided with a slot adapted to be engaged over the tongue of the inner spring member, said outer spring member tending to cause the walls of the slot and the transverse opening to grip the fender flange, the outer face of the lug being provided with a groove in which the outer spring member seats to prevent unintentional sidewise displacement of the latter.

LLOYD M. LITTLEFIELD.